(12) United States Patent
Pfister

(10) Patent No.: US 6,490,534 B1
(45) Date of Patent: Dec. 3, 2002

(54) CAMERA MEASUREMENT SYSTEM

(76) Inventor: Henry Pfister, 105 Lisa Marie Pl., Shalimar, FL (US) 32579

( * ) Notice: Subject to any disclaimer, the term of this patent is extended or adjusted under 35 U.S.C. 154(b) by 18 days.

(21) Appl. No.: 09/839,317

(22) Filed: Apr. 20, 2001

Related U.S. Application Data

(60) Provisional application No. 60/200,062, filed on Apr. 25, 2000.

(51) Int. Cl.$^7$ .............................. G06F 19/00; G06K 9/36
(52) U.S. Cl. ......................... 702/94; 702/150; 702/155; 382/173; 382/286
(58) Field of Search ............................... 702/85, 94, 95, 702/127–128, 150, 155, 158–159; 382/106, 107, 173–175, 282–284, 286; 348/77, 128, 571, 586

(56) References Cited

U.S. PATENT DOCUMENTS

| | | | | |
|---|---|---|---|---|
| 4,602,280 A | * | 7/1986 | Maloomian | 348/77 |
| 5,477,332 A | * | 12/1995 | Stone et al. | 348/128 |
| 5,631,975 A | * | 5/1997 | Riglet et al. | 382/173 |
| 5,818,975 A | * | 10/1998 | Goodwin et al. | 382/274 |
| 5,914,748 A | * | 6/1999 | Parulski et al. | 348/586 |

* cited by examiner

Primary Examiner—Bryan Bui
(74) Attorney, Agent, or Firm—Norton R. Townsley

(57) ABSTRACT

A camera based measurement system which can automatically determine tailor body measurements with one camera, few pictures and without requiring the customer to wear special garments. The present invention will automatically detect the neck and other body features and can perform the function with a single camera, and a relatively small number of views.

30 Claims, 6 Drawing Sheets

FIG. 3

CALIBRATION PROCESS
DIGITIZE BACKGROUND IMAGE ⟶ VBACK.CE
DIGITIZE CALIBRATION IMAGE ⟶ VCALIB.CE
SUBTRACT VBACK.CE FROM VCALIB.CE
CONVERT VCALIB.CE TO BINARY SILHOUETTE
FEATURE SEARCH VCALIB.CE FOR FIVE CROSS POINTS
CONVERT PIXEL POINTS TO UNITS
SAVE CALIBRATION AS VCALIB.FE
DISPLAY VCALIB.CE WITH VCALIB.FE POINTS

FIG. 4

IMAGE COLLECTION PROCESS
CONTROL CAMERA AND FRAME DIGITIZER TO CREATE THE FOLLOWING
SUBJECT IMAGE FILES STORED IN CE FORMAT
COLLECT VIDEO IMAGE FRONT VIEW ⟶ VFRONT.CE
COLLECT VIDEO IMAGE LEFT VIEW ⟶ VLEFT.CE
COLLECT VIDEO IMAGE REAR VIEW ⟶ VREAR.CE
COLLECT VIDEO IMAGE RIGHT VIEW ⟶ VRIGHT.CE

FIG. 5

FEATURE DETECTION PROCESS
READ VBACK.CE BACKGROUND IMAGE
READ VFRONT.CE − SUBTRACT VBACK.CE, MAKE SILHOUETTE
READ VLEFT.CE − SUBTRACT VBACK.CE, MAKE SILHOUETTE
READ VREAR.CE − SUBTRACT VBACK.CE, MAKE SILHOUETTE
READ VRIGHT.CE − SUBTRACT VBACK.CE, MAKE SILHOUETTE
FIND TOP OF HEAD FEATURE IN ALL SILHOUETTES
FIND CENTERLINE FEATURE IN ALL SILHOUETTES
IN FRONT AND REAR SILHOUETTES:
FIND ARMPITS, NECK POINTS, CROTCH, AND FINGER TIPS
IN LEFT AND RIGHT SILHOUETTES:
FIND NECK SLOPE, BUST, WAIST, HIPS AND THIGHS
IN FRONT AND REAR SILHOUETTES:
FIND CHEST, WAIST, HIPS AND THIGHS
SAVE FEATURE POINTS IN FILES:
VFRONT.FE, VLEFT.FE, VREAR.FE, VRIGHT.FE

FIG. 6

```
             TAILOR MEASUREMENT PROCESS
    READ ALL FOUR .FE FILES FOR FEATURE POINT DATA IN UNITS
   AVERAGE TOP OF HEAD FOR HEIGHT IN UNITS FROM FOUR IMAGES.
    MODEL NECK AS TILTED ELLIPSE AND COMPUTE CIRCUMFERENCE
                  FROM FOUR NECK FEATURE POINTS.
    MODEL CHEST AS LEVEL ELLIPSE AND COMPUTE CIRCUMFERENCE
                  FROM FOUR CHEST FEATURE POINTS.
    MODEL WAIST AS TILTED ELLIPSE AND COMPUTE CIRCUMFERENCE
                  FROM FOUR WAIST FEATURE POINTS.
        MODEL JACKET AS SHOULDER WIDTH USING FRONT VIEW
                      SHOULDER FEATURE POINTS.
    MODEL SEAT AS HIP ELLIPSE USING FRONT VIEW HIP FEATURE POINT.
 MODEL SLEEVE AS SHOULDER TO WRIST LENGTH AND COMPUTE CIRCUMFERENCE
                  FROM HIP TO FINGERTIP FEATURE POINTS.
     MODEL PANT INSEAM AS SLOPED CROTCH TO FLOOR LENGTH LESS
                  ANKLE HEIGHT USING FRONT VIEW FEATURES.
       MODEL SLEEVE INSEAM AS SLOPED ARMPIT TO WRIST LENGTH
                  USING FRONT VIEW FINGERTIP FEATURES.
      SAVE NINE TAILOR MEASUREMENTS IN MEAS.ME AS A TEXT FILE.
         DISPLAY MEASUREMENT DATA AS TEXT ON COMPUTER SCREEN.
```

CAMERA MEASUREMENT SYSTEM

CROSS REFERENCE TO RELATED APPLICATIONS

The Applicant claims the benefit of his Provisional Application, Ser. No. 60/200,062, filed Apr. 25, 2000.

BACKGROUND OF THE INVENTION

The present invention relates to the field of tailoring and provides a measurement system, wherein a user in a remote location, or in a store, can quickly be measured for any number of garments using a camera.

Prior art tailor measuring systems require that the subject wear a special tight-fitting garment with target points on the garment, and full body scans or multiple cameras. Additionally, in the prior art, body features, such as the neck, had to be detected by hand or with specially marked points.

Development of a camera based measurement system which can automatically determine tailor body measurements with one camera, few pictures and without requiring the customer to wear special garments represents a great improvement in the field of tailoring and satisfies a long felt need of the public.

SUMMARY OF THE INVENTION

The present invention is a camera based measurement system which can automatically determine tailor body measurements with one camera, few pictures and without requiring the customer to wear special garments. The present invention will automatically detect the neck and other body features and can perform the function with a single camera, and a relatively small number of views, typically four.

This invention captures the silhouette of a user not his or her image. In a preferred embodiment, customers face the camera with their arms held away from their body at about 45 degrees. Preferably, customers should wear a swimming suit or any tight fitting garment for the silhouette making process. Although a camera takes a picture it is immediately converted to a silhouette to perform the calculations. The silhouette is then compressed into a very small file that contains only the customer's 9 body measurements. No one ever looks at or saves any actual photographs. The image that is captured is transient and is lost as the image is processed into a silhouette. This technology enables derivation of the nine traditional tailor measurements—height, neck, chest, waist, hip, seat, sleeve length, sleeve inseam and pant inseam—necessary to fit a garment to the human body. Collecting the data at a retailer who has installed the technology takes approximately two minutes.

Two silhouettes are needed: front and side. This technology measures customers faster, more consistently, more accurately and less intrusively than traditional hand measuring. The input and transmission of measurement data is standardized and automated, eliminating errors resulting from recording measurement data by hand.

The digital silhouettes become a cyber mannequin. This technology computes both two- and three-dimensional measurements from the data captured by a digital camera and represented by a silhouette. This data is electronically processed to match online retailer's garment specifications to facilitate the perfect fit.

When shoppers arrive at participating online apparel stores, armed with their nine body measurements—height, neck, chest, waist, hip, seat, sleeve length, sleeve inseam and pants inseam—their data is matched to the retailer's existing computerized pattern storage system. Instead of guessing which size to buy, shoppers will know that the garment they receive has been electronically selected to best match their body.

While it is possible for shoppers to download the software and instructions at home and create their own body measurement data file, participating retailers offer the measurement technology of this invention in the privacy of their dressing rooms.

An appreciation of the other aims and objectives of the present invention and an understanding of it may be achieved by referring to the accompanying drawings and description of a preferred embodiment.

BRIEF DESCRIPTION OF THE DRAWINGS

FIG. 3 is a chart providing more detail regarding the calibration step.

FIG. 4 is a chart providing more detail regarding the image collection step.

FIG. 5 is a chart providing more detail regarding the feature detection step.

FIG. 6 is a chart providing more detail regarding the tailor measurement step.

DETAILED DESCRIPTION OF THE PREFERRED EMBODIMENT

The present invention provides a camera measurement system, wherein a user in a remote location, or in a store, can quickly be measured for any number of garments using a camera. The process begins with the camera focusing on a plain background. Blue has been found to work well. Two images are recorded on film, digitally or by some other means. If the images are initially recorded optically on film, any one of a number of commercially available software packages can convert them into digital images (see FIG. 9). These first two views are taken without any subject or customer (person to be measured), one of the background, and one of a calibration target. Any number of objects can be utilized for a calibration target, however, it has been found that a T shaped target works particularly well. The target must have markings in units of measurement such as inches and fractions or centimeters and millimeters. In an alternative embodiment, the calibration and background images may be combined.

After the subject-less images are taken, a number of views of the subject are taken. Four has been found to work well. Those views are back, front, left side and right side. As described in more detail below, the digital image will be converted into a silhouette, and the silhouette used to detect certain body points (such as armpits and crotch, shoulders, hands, waist, neck, etc.). Once those body points are detected, the system compares distances on the image of the subject to the known distances in the calibration target and then calculates any number of measurements of the body.

Figure 1:
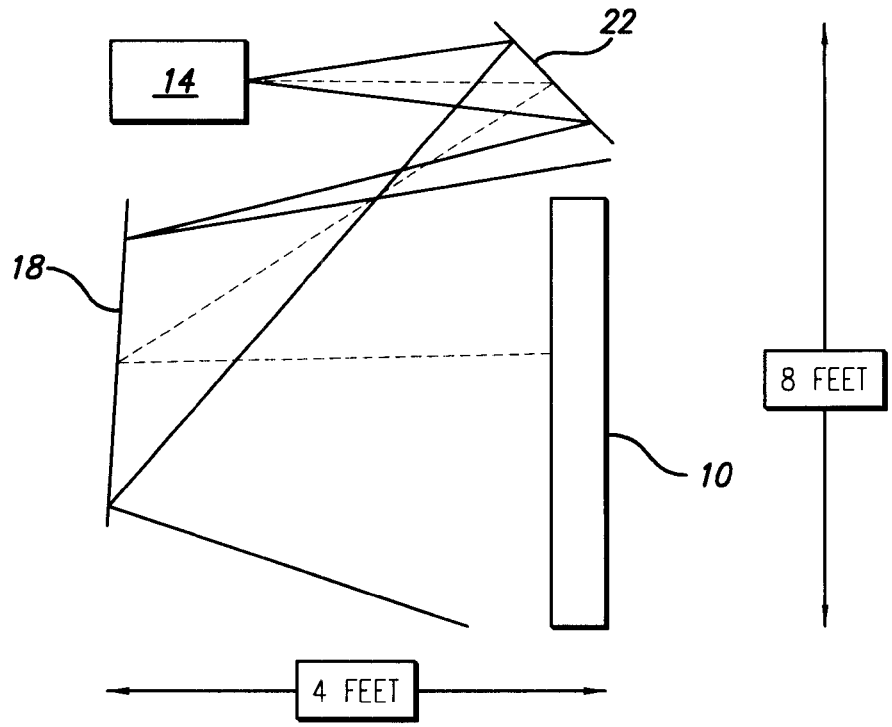
FIG. 1 is a side elevational representation of a booth that can be used to practice this invention.

The present invention can be practiced using a home digital camera or a home film camera 14. It has been found that using a 5'×6'×7' booth with a 12' camera-to-subject length yields excellent results. Mirrors 18, 22 may reduce the size of the booth considerably. See FIG. 1. The entire image capturing process presently takes about one minute to complete. There are four different images that need to be captured for each person 10.

Front Image:

The individual 10 stands looking straight ahead. Feet are approximately 12 inches apart. The arms should hang downward and slightly extended from the body. There should be about 8 inches between the side of the body and the arm itself. The hand should be clasped into a fist, with the thumb wrapped over the pointer finger.

Right Image:

The individual 10 should stand perfectly straight with their feet close together. The arms should hang directly to the side of the body. Posture is important here. The hands remained clasped into a fist, with the thumb wrapped over the pointer finger.

Rear Image:

The rear image mirrors the front view. The individual 10 stands with arms hanging downward, extending from the side of the body by about 8 inches. Hands are clasped into a fist, with the thumb wrapped over the pointer finger.

Left Image:

Follow the same procedure that was used for the right image. The individual 10 must stand with feet together, arms directly at each side. Hands are clasped with the thumb wrapped over the pointer finger.

Figure 2:
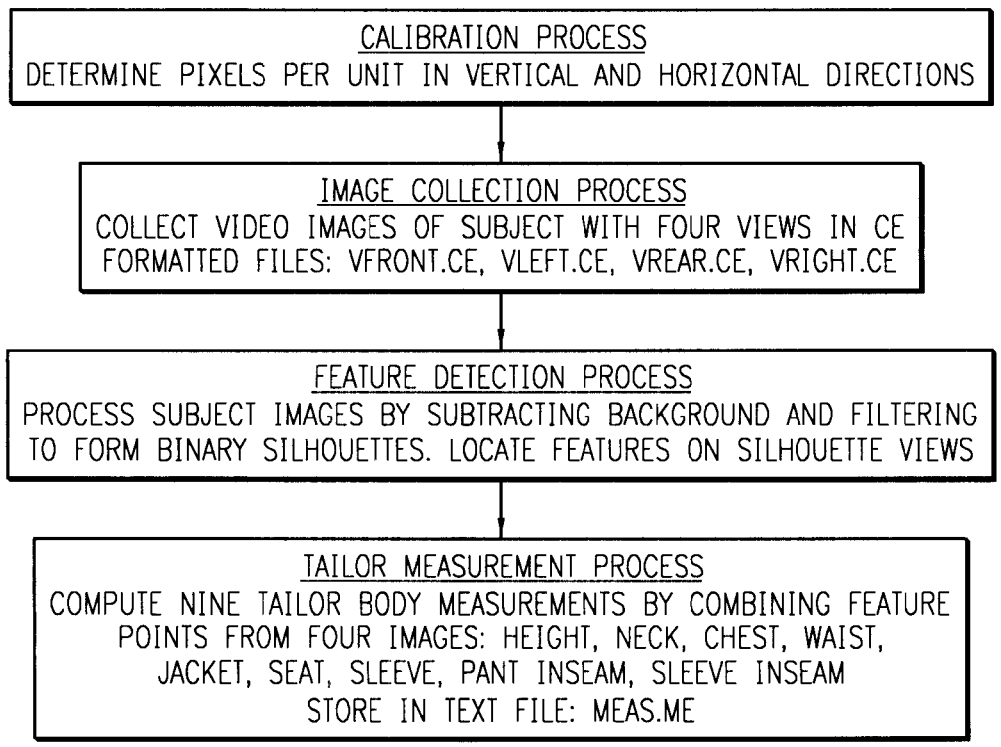
FIG. 2 is an overall flowchart of this invention
Figure 7:
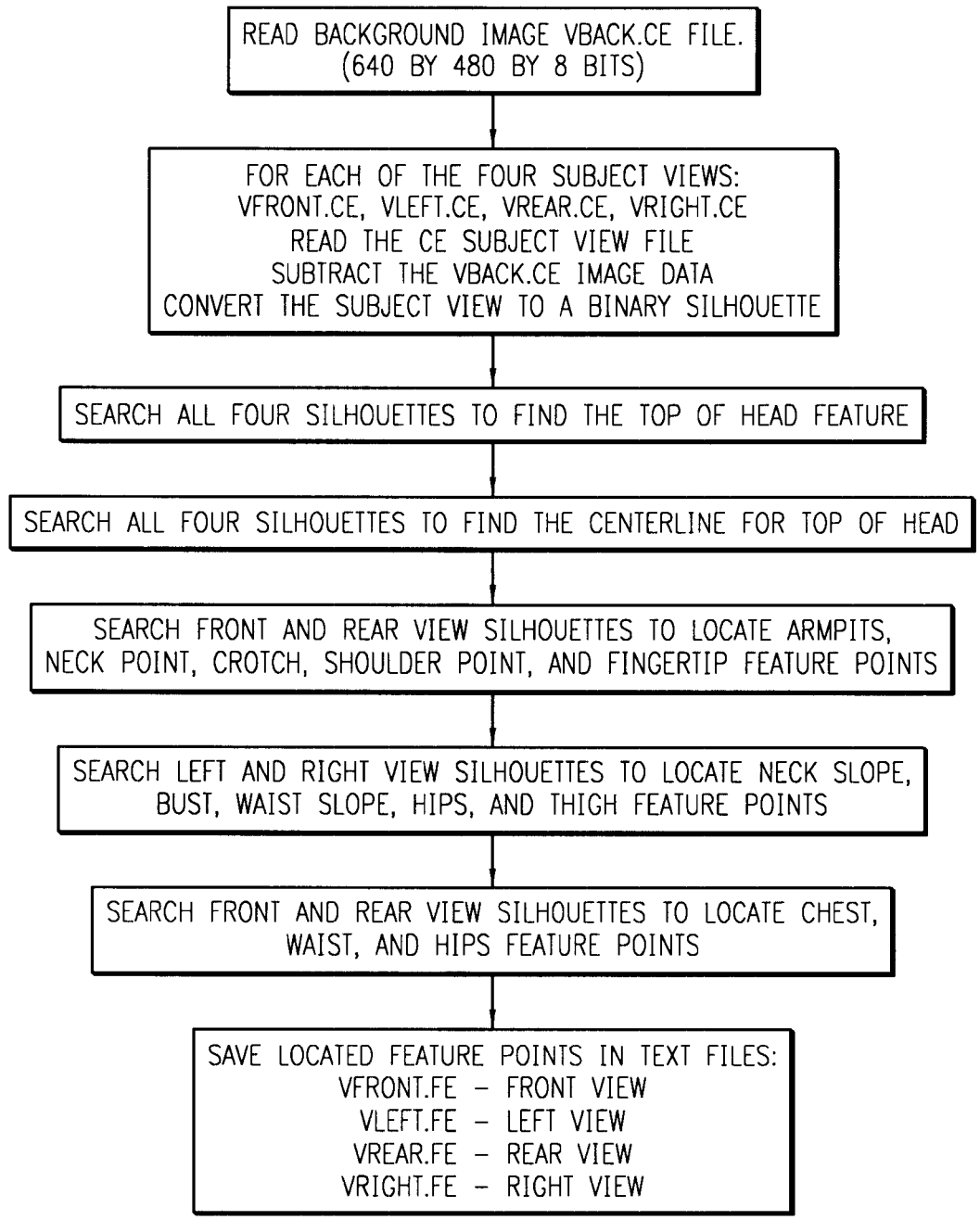
FIG. 7 is a flowchart of the feature detection step.
Figure 8:
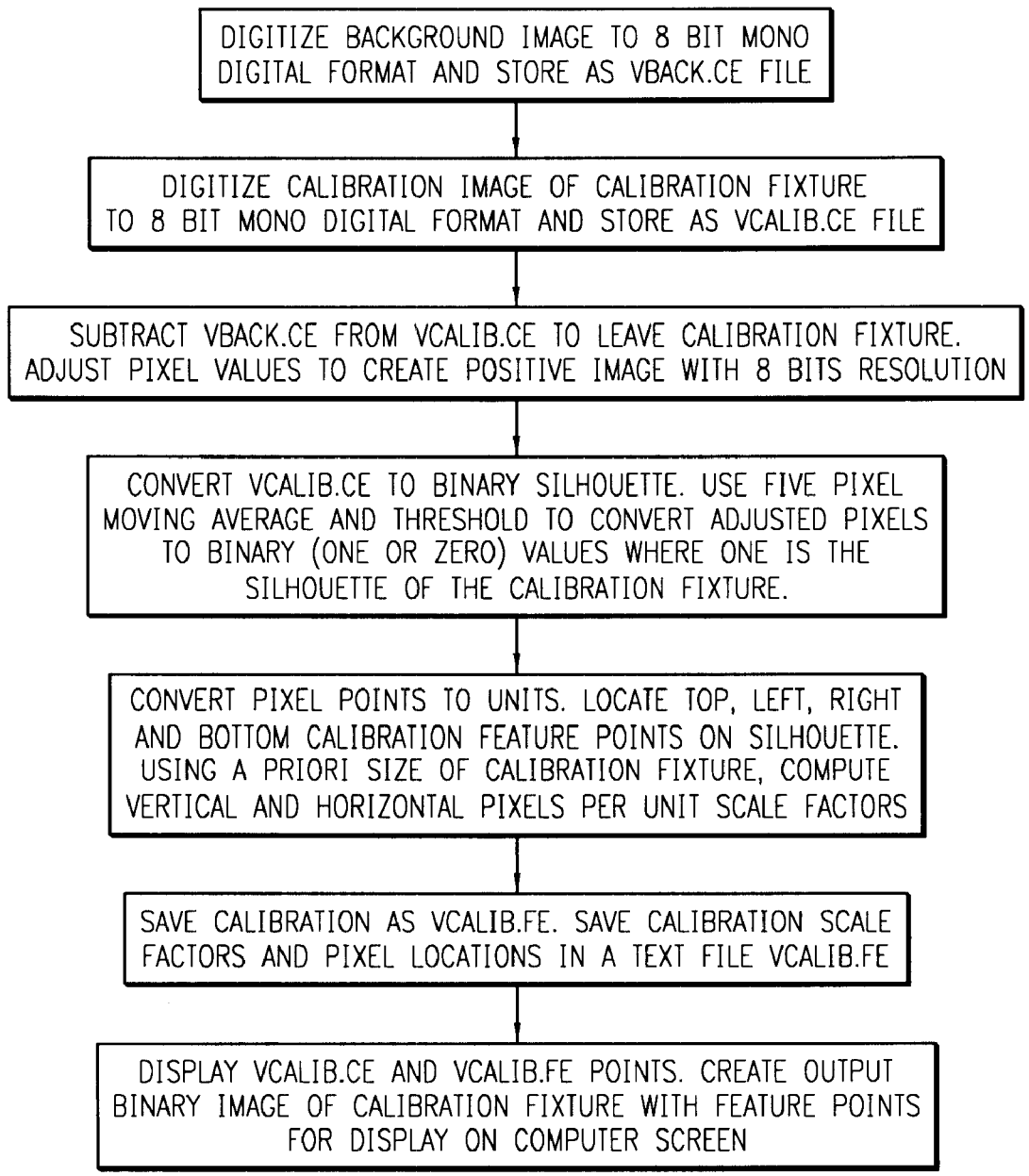
FIG. 8 is a flowchart of the calibration step.

The best description of this invention may be derived from the Figures. FIG. 2 provides an overall flowchart of this invention. FIG. 3 provides more detail regarding the calibration step, while FIG. 8 is a flowchart of this step. The five cross points of the calibration target are the four end points and the center. FIG. 4 provides more detail regarding the image collection step. FIG. 5 provides more detail regarding the feature detection step, while FIG. 7 is a flowchart of this step. The shoulder points are the sides of the neck, as seen from the front view, and the narrowest tilted portion of the neck as seen from the side view. The shoulder point is the point at which the change in slope of the shoulder is greatest. All measurements are off the centerline. Measurements, for example the waist measurement, maybe obtained by creating ellipses that pass through the waist detection points of each of the four views. The formula to determine these measurements from the multiple ellipses can be found in commonly available mathematical texts.

Figure 9:
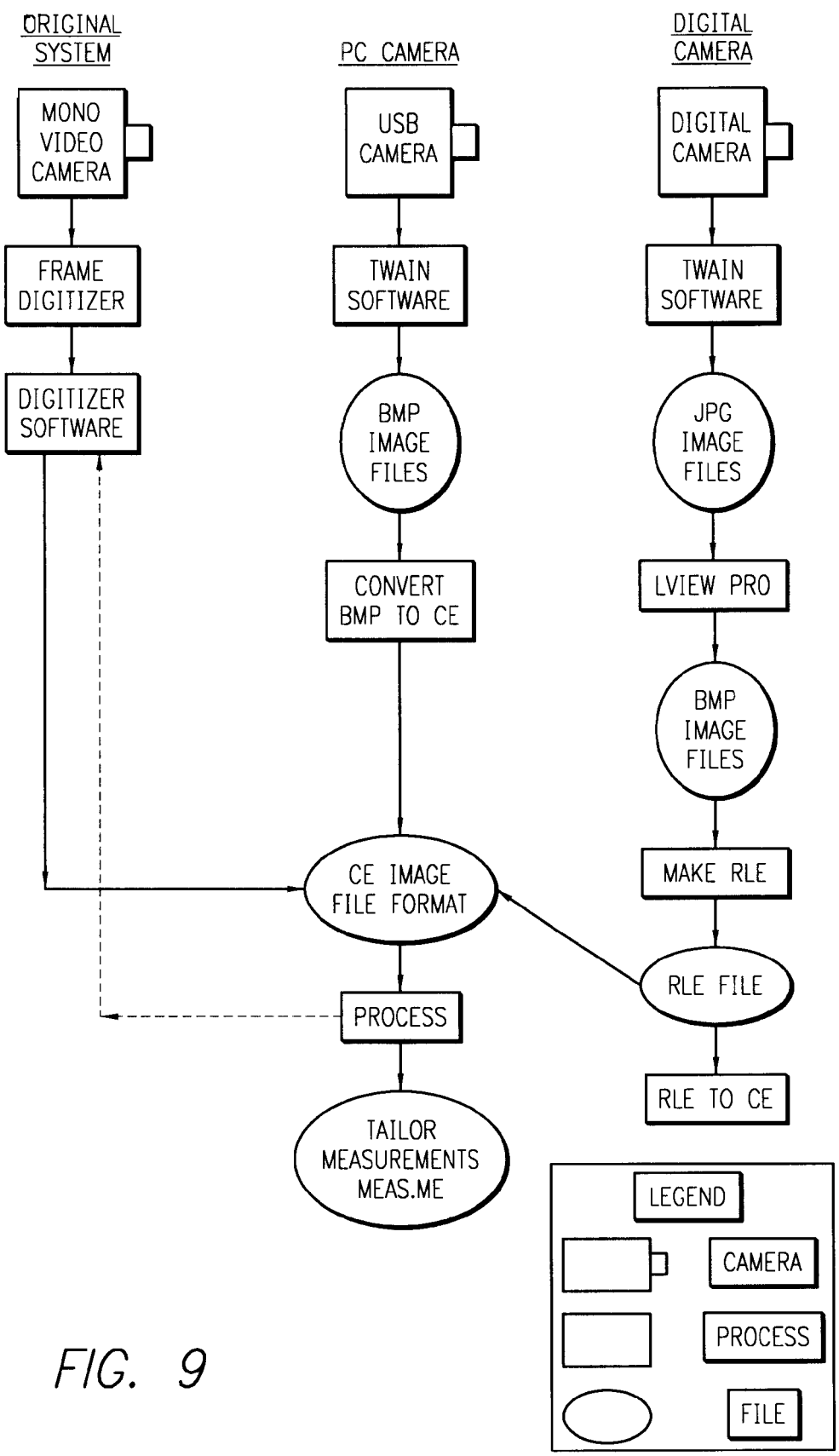
FIG. 9 is a flowchart of data flow in this invention.

FIG. 9 is a flowchart of data flow in this invention. The preferred frame digitizer is Computer Eyes I RT Monochrome, Gray-scale Video Frame grabber—1992, available from Digital Vision, Inc., 270 Bridge Street, Dedham, Mass. 02026, (617) 329-5400. However, other frame digitizers are available and could be used. Lview Pro is the preferred are for converting JPG image files to BMP (bitmap). The BMP to CE format conversion is done by translating image pixel data for a line of 640 bytes with 8 bit monochrome intensity to a bit plane order from most significant to least significant as 8 groups of 80 bytes with 8 bits of plane data. Numerous algorithms are possible for this translation. RLE is a run length encoded compression of a silhouette or binary image on a line by line basis using the start and end of the image line segments. The inverse process is used to reconstruct a BMP format which is converted to a CE format. One good reference for mathematical functions used in the measurement process is "Numerical Recipes In C The Art of Scientific Computing"—Second Edition Cambridge University Press, 1992. Images of photos from digital scanners are in a line by line format. Each line is converted to 8 bit monochrome format of length 640 pixels. Line formats are converted to CE format as described above.

FIG. 6 provides more detail regarding the tailor measurement step. Once the measurements are obtained, they can be used in any number of ways. In one embodiment the present invention electronically supplies that information to one of any number commercially available automatic fabric cutting devices, providing the user with a made to measure garment. In another embodiment, the measurements are provided directly to the user or the user's clothier to properly select commercially available garments. In a third embodiment, the measurements are compared to the standardized patterns of one or more manufacturers, to determine which size garment from that particular manufacturer is appropriate to the individual user. In another embodiment, the user's measurements are available through an Internet site, from which the user can then go to Internet sites of various clothiers. In such an embodiment, when the user selects a garment, the present invention will automatically compare the user's measurements to the patterns used by that clothier and either inform the user of the correct size garment to order, or automatically insert the correct size in the appropriate place in the on-line order form.

In another embodiment of the present invention, the user may simply take his or her own photograph with a known reference target in the picture or take his or her picture and a separate photograph of a known reference target. These photograph(s) are then submitted to a central processing center, electronically digitized or in analog format, or by any other means including mail. The central processing center then scans the photograph(s), if necessary to convert into digital form, and then proceeds to process them as described above.

It should be clear that any number of images and views may be taken, and any number of measurements may be generated, from a single view. For example one can measure only the user's waist or make a large number of body measurements, in order to create a suit that exactly fits the user's body.

Feature detection and measurement computations are key components that are used to derive the many intricate body landmark points required for creating individual body measurements. The feature location and body measurement computation technology consists of a digital camera, a desktop PC and proprietary software. This proprietary software captures and registers multiple body images in three dimensions, locates feature points in multiple images, and computes body measurements using both linear and circular models. Reference is made to a visible body structure or landmark; an example would be the outer corner of the eye. Often axis intersect points are used as a beginning of a measurement. From these landmark body structures, geometric relationships are formed with other body landmarks, which define the required measurement. The garment size data is compiled from a number of these body measurements. This body measurement system reverses this process. The starting point is a surface represented by the points captured by a camera. The data from multiple two-dimensional digital images is combined to form an input stream to compute measurements. The final data is an input stream of three-dimensional numerical values representing the feature surface of the subject.

Camera image processing removes background surface data and transforms the image into planes of information from which silhouettes, or image edges, are derived. These silhouettes are catalogued by orientation to the axis of a body so that a hierarchy of feature detection algorithms can be applied to identify numerical points of data. This data represents the same landmarks described in the dictionary of measurements. Thus the detection of body features, which a tailor would look for or feel on a subject, are now found by an analysis of their data values. The body feature points are therefore the highest resolution unit of measurement.

Having established a vocabulary of landmark skeletal and musculature features in a digital language, the technology is capable of extracting the desired body measurements. This process applies the same geometrical relationships as described in the definitions of the measurement. From a given landmark, the measurement is taken in the prescribed geometric direction until the next digital landmark is contacted.

Thus image processing transforms the digital camera image of discrete points into a series of two-dimensional silhouettes, using planes to intersect the output. Fuzzy logic locates the appropriate body features in the silhouette planes, and a rule-based process is used to select feature points associated with the required measurements. To compute linear and circular tailor measurements from the landmark features, a unique combination of analytic geometry equations is applied.

The algorithms used in this invention are divided into two groups. First, the determination of the location of body feature points on binary silhouette images of the subject. Second the computation of tailor measurements using the feature point data and mathematical models of tailor measures.

Feature Point Location Algorithms

Five feature point silhouette images are formed by subtracting the background image from the subject image. The five subject images are as follows:

1 Front view of subject
2 Left side view of subject
3 Rear view of subject
4 Right side view of subject
5 Front view of calibration fixture The fifth image is used to determine the number of pixels per inch in the horizontal and vertical directions for calibration of the tailor measurements. Five points are located on the cross shaped calibration fixture. The points are the top, left, right, and bottom point defined by a lower tab on the fixture. The following example file is produced by this process that consists of four records with three fields per record. The first field is a designator where 9xxx represents calibration and 001 to 004 specifies the four points for extremes of the four cross points in image pixels where (0,0) is in the top left corner:

SAMPLE CALIBRATION FEATURES DATA FILE—VCALIB.FE 9001 230 207
9002 230 618
9003 27 412
9004 434 412

The process for locating these features is to search in a single direction until a large (as defined by fuzzy logic) black line of pixels is detected. The four search directions are top down, left to right, right to left, and bottom up.

The first image is the front view of the subject and can be searched for the following thirty six feature points as shown in the example file. Only eighteen or the thirty six point definitions are currently used. The unused spare points have negative values in fields two and three. Each point is defined by the first field which has 1xxx to indicate the front views and 001 to 036 to indicate the feature point. These are table driven and can be redefined in the software. For example, the first point is the top of head located at the highest large black line of pixels along the body center line.

SAMPLE FRONT VIEW FEATURES DATA FILE—VFRONT.FE 1001 195 146
1002 181 239
1003 231 239
1004 145 356
1005 270 353
1006 151 416
1007 266 416
1008 140 473
1009 280 473
1010 135 515
1011 282 515
1012 206 256
1013 284 279
1014-32-32
1015 209 557
1016-32-32
1017 208 416
1018-32-32
1019-32-32
1020-32-32
1021-32-32
1022-32-32
1023-32-32
1024-32-32
1025 235 256
1026 178 256
1027-32-32
1028-32-32
1029-32-32
1030-32-32
1031-32-32
1032-32-32
1033-32-32
1034-32-32
1035-32-32
1036 337 526

The second image is the left side view of the subject and can be searched for the following twelve feature points as shown in the example file. Each point is defined by the first field which has 4xxx to indicate the left side views and 001 to 012 to indicate the feature point. These are table driven and can be redefined in the software. For example the first point is the top of head located at the highest large black line of pixels along the body center line.

SAMPLE LEFT SIDE VIEW FEATURES DATA FILE—VLEFT.FE 4001 193 152
4002 179 271
4003 228 255
4004 151 326
4005 258 326

4006 143 416
4007 234 416
4008 141 458
4009 254 458
4010 147 505
4011 266 505
4012 203 263

The third image is the rear view of the subject and can be searched for the following twelve feature points as shown in the example file. Each point is defined by the first field which has 3xxx to indicate the rear view and 001 to 012 to indicate the feature point. These are table driven and can be redefined in the software. For example the first point is the top of head located at the highest large black line of pixels along the body center line.

SAMPLE REAR VIEW FEATURES DATA
FILE—VREAR.FE 3001 197 145
3002 174 237
3003 225 237
3004 133 352
3005 268 349
3006 143 415
3007 258 415
3008 132 466
3009 270 466
3010 128 512
3011 277 512
3012 199 237

The fourth image is the right side view of the subject and can be searched for the following twelve feature points as shown in the example file. Each point is defined by the first field which has 2xxx to indicate the right side views and 001 to 012 to indicate the feature point. These are table driven and can be redefined in the software. For example the first point is the top of head located at the highest large black line of pixels along the body center line.

SAMPLE RIGHT SIDE VIEW FEATURES DATA
FILE—VRIGHT.FE 2001 175 144
2002 163 246
2003 212 262
2004 137 322
2005 244 322
2006 161 416
2007 254 416
2008 142 458
2009 256 458
2010 135 505
2011 252 505
2012 187 254

All feature points in all images are located by the same general algorithm with only controls for direction and stopping rules. For example, the top of head is located by searching down from the top of the image until a large black pixel line is detected to determine the vertical location. The horizontal location is the middle point of the large line. Similarly, the crotch in the front and rear images is located by searching up from the bottom between the spread legs (two black lines separated by a long white line of pixels) until a large black line is detected. These binary image searching methods are well known and described in numerous image processing texts and papers. The process is continued until all points are located in all images. The resulting points in pixel coordinates are written to the feature files as shown in the five examples above.

Tailor Measurement Algorithms

The tailor measurement process reads all five of the feature files and produces a measurement file as shown in the following example. The nine tailor measurement entry file consists of records that have an identifier field and a value field. For example, the first record is the subject height labeled 1001 with a value of 69.18 inches. The fields are labeled for clarity by "—name of tailor measurement" that does not appear in the file.

SAMPLE TAILOR MEASUREMENT DATA
FILE—MEAS.ME 1001 69.18—height
3001 15.39—neck
3002 38.13—chest
4001 31.61—waist
4002 35.32—jacket
4003 37.67—seat
7001 32.96—sleeve
5001 30.67—inseam pants
7002 16.59—inseam sleeve The following is a listing of the computer program to compute all nine tailor measurements with each computational algorithm identified. For example, the height measurement 1001 is computed first by summing the four image features labeled n001 where n goes from 1 to 4 into variable sum and adding the offset of the calibration from the ground of thirty six inches. Each of the measurements is listed in order and the computation is easily understood by anyone skilled in the art of computer programming using visual basic. This is a test program developed to verify and validate the correct operation of the C/C++ program implemented in VMS for reasons of efficiency and speed. The computations agree identically to six decimal places.

VISUAL BASIC PROGRAM LISTING TO
COMPUTE NINE VMS TAILOR
MEASUREMENTS

```
Public Sub measurements( )
  'compute VMS measurements from features
  Dim i, j, k, l, n As Integer
  Dim sum, sumd, a, a1, b, c, arc, d, e, f As Double
  Dim bb0, bb1, bb2, bb3, bb4, bb5 As Double
  'Measurement 1001—Height
  n=1
  mnum(n)=1001
  mnam(n)="Height"
  sum=0#
  l=0
  For i=1 To 4
    k=i*1000+1
    j=Feature(k)
    If j=0 Then
      Debug.Print "Missing Top of Head in View"; k
    Else
```

```
sum=sum+yy(j)
l=l+1
End If
Next i
a=sum/l
j=Feature(1015)
sum=Sqr(yy(j)*yy(j)+36#)
sum=sum-yy(j)
a=a+sum
mm(n)=a
Debug.Print mnam(n); mnum(n); mm(n)
'Measurement 3001—Neck
n=2
mnum(n)=3001
mnam(n)="Neck"
bb0=distance(1002, 1003)
bb1=distance(2002, 2003)
bb2=distance(3002, 3003)
bb3=distance(4002, 4003)
a=pi*(bb0+bb1+bb2+bb3)/4#
mm(n)=a
Debug.Print mnam(n); mnum(n); mm(n)
'Measurement 3002—Chest
n=3
mnum(n)=3002
mnam(n)="Chest"
bb0=distance(1004, 1005)
bb1=distance(2004, 2005)
bb2=distance(3004, 3005)
bb3=distance(4004, 4005)
a=pi*(bb0+bb1+bb2+bb3)/4#
mm(n)=a
Debug.Print mnam(n); mnum(n); mm(n)
'Measurement 4001—Waist
n=4
mnum(n)=4001
mnam(n)="Waist"
bb0=distance(1006, 1007)
bb1=distance(2006, 2007)
bb2=distance(3006, 3007)
bb3=distance(4006, 4007)
a=pi*(bb0+bb1+bb2+bb3)/4#
mm(n)=a
Debug.Print mnam(n); mnum(n); mm(n)
'Measurement 4002—Jacket
n=5
mnum(n)=4002
mnam(n)="Jacket"
bb0=distance(1008, 1009)
bb1=distance(2008, 2009)
bb2=distance(3008, 3009)
bb3=distance(4008, 4009)
a=pi*(bb0+bb1+bb2+bb3)/4#
mm(n)=a
Debug.Print mnam(n); mnum(n); mm(n)
'Measurement 4003—Seat
n=6
mnum(n)=4003
mnam(n)="Seat"
bb0=distance(1010, 1011)
bb1=distance(2010, 2011)
bb2=distance(3010, 3011)
bb3=distance(4010, 4011)
a=pi*(bb0+bb1+bb2+bb3)/4#
mm(n)=a
Debug.Print mnam(n); mnum(n); mm(n)
'Measurement 7001—Sleeve Length
n=7
mnum(n)=7001
mnam(n)="Sleeve Length"
bb0=distance(1012, 1013)
d=xx(Feature(2003))
e=distance(2004, 2005)/2#
f=xx(Feature(2004))
arc=d-e-f
bb0=Sqr(arc*arc+bb0* bb0)
bb1=distance(1013, 1036)
sum=bb0+bb1-2#
mm(n)=sum
Debug.Print mnam(n); mnum(n); mm(n)
'Measurement 5001—Pant Inseam
n=8
mnum(n)=5001
mnam(n)="Pant Inseam"
j=Feature(1015)
a=yy(j)*yy(j)
sum=Sqr(a+36#)+1#
mm(n)=sum
Debug.Print mnam(n); mnum(n); mm(n)
'Measurement 7002—Sleeve Inseam
n=9
mnum(n)=7002
mnam(n)="Sleeve Inseam"
bb0=distance(1005, 1036)
sum=bb0-2.5
mm(n)=sum
Debug.Print mnam(n); mnum(n); mm(n)
End Sub
Public Function distance(ByVal f1, f2 As Integer) As Double
'returns distance between two features
Dim i, j, k As Integer
Dim a, b, c, x1, x2, y1, y2 As Double
i=Feature(f1)
x1=xx(i)
y1=yy(i)
i=Feature(f2)
x2=xx(i)
y2=yy(i)
a=x1-x2
b=y1-y2
c=a*a+b*b
distance=Sqr(c)
End Function
```

The data produced by the system is compatible with the National Institute of Standards and Technology (NIST) Standard for the Exchange of product Model Data (STEP) and the NIST body dimensions for apparel This technology can be used when shopping online or in-store at any participating retailer. Shoppers can register to use this technology at a participating online merchant or physical store. Once their body measurements are on file, they can begin the shopping process. Retailers may offer to download the software and instructions for shoppers who wish to create their files at home.

On-line stored body measurement data is password protected. A customer may allow another person access to their file by providing the correct username and password. Individuals may want to use this feature when gift buying or to allow an affiliated merchant to create a custom fit, one-of-a-kind garment.

Keeping accurate measurements on file is important. Therefore, customers should update their files when they gain or lose weight. All major manufacturers have computerized pattern storage systems, which will interface with the 9 body measurements online shoppers bring to their site.

This technology is better than hand measuring because it measures customers more consistently, more accurately, less intrusively and faster than traditional hand measuring. Also, the input and transmission of measurement data is standardized and automated, thus eliminating errors resulting from recording measurement data by hand.

The camera body measurement system has been described with reference to a particular embodiment. Other modifications and enhancements can be made without departing from the spirit and scope of the claims that follow.

What is claimed is:

1. A method of calculating tailor body measurements comprising the steps of:
   a. providing a camera;
   b. providing a computer;
   c. connecting said camera to said computer;
   d. providing software;
   e. installing said software on said computer;
   f. taking a background picture with said camera;
   g. saving said background picture to a background image file on said computer;
   h. taking a calibration picture with said camera;
   i. saving said calibration picture to a calibration image file;
   j. taking a number of pictures of a subject from a number of sides;
   k. saving said number of pictures to a number of subject image files;
   l. subtracting said background image file from each of said subject image files to form a number of binary silhouette files;
   m. determining pixels per inch in the vertical and horizontal directions from said calibration image file;
   n. locating pertinent body features from said binary silhouette files;
   o. saving said pertinent body features in a file;
   p. computing tailor body measurements by combining said pertinent body features on said binary silhouette files and comparing distances to said calibration image file; and
   q. saving said tailor body measurements in a text file.

2. A method of calculating body measurements as claimed in claim 1 in which the number of pictures is four and the sides are front, rear, left and right.

3. A method of calculating body measurements as claimed in claim 1 in which said calibration picture includes a T shaped target including calibration markings.

4. A method of calculating body measurements as claimed in claim 1 in which said pertinent body features are top of head, centerline, armpits, neck points, crotch, fingertips, neck slope, bust, waist, hips, thighs, and chest.

5. A method of calculating body measurements as claimed in claim 1 in which said tailor body measurements are height, neck, chest, waist, jacket, seat, sleeve, pant inseam and sleeve inseam.

6. A method of calculating body measurements as claimed in claim 1 in which said camera is selected from the group consisting of a video camera, a digital camera and a film camera.

7. A method of calculating body measurements as claimed in claim 1 further comprising the step of automatically feeding said tailor body measurements to an automatic fabric cutting machine in order to fabricate a garment with the best fit.

8. A method of calculating body measurements as claimed in claim 1 further comprising the step of automatically comparing said tailor body measurements to a manufacturer's standard pattern library in order to select the best fit.

9. A method of calculating body measurements as claimed in claim 1 further comprising the step of storing said tailor body measurements on a web site where they are password protected so that only the subject and those authorized by him or her can access said tailor body measurements.

10. A method of calculating body measurements as claimed in claim 9 further comprising the step of comparing, on request, said tailor body measurements to the pattern library of an online garment vendor.

11. A method of calculating body measurements as claimed in claim 10 further comprising the step of automatically entering said tailor body measurements into an online garment order form.

12. A method of calculating tailor body measurements comprising the steps of:
   a. providing a camera;
   b. providing a computer;
   c. connecting said camera to said computer;
   d. providing software;
   e. installing said software on said computer;
   f. taking a background picture with said camera;
   g. digitizing said background picture to convert to 8 bit mono digital format and storing as VBACK.CE file;
   h. providing a calibration target calibrated in measurement units;
   i. placing said calibration target in the field of view of said camera;
   J. taking a calibration picture with said camera;
   k. digitizing said calibration picture to convert to 8 bit mono digital format and storing as VCALIB.CE file;
   l. subtracting VBACK.CE from VCALIB.CE to leave said calibration target;
   m. adjusting pixel values to create a positive image with 8 bits resolution;
   n. converting VCALIB.CE to a binary calibration target silhouette using a five pixel moving average and threshold to convert adjusted pixels to binary values where one is the calibration target silhouette;

o. converting pixel points to measurement units;
p. locating the top, left, right, and bottom calibration feature points on said calibration target silhouette;
q. computing vertical and horizontal pixels per measurement unit scale factors using size of calibration target;
r. saving said scale factors and feature point locations in a text file, VCALIB.FE
s. creating output binary image of calibration fixture with feature points for display on computer screen, using VCALIB.CE and VCALIB.FE;
t. taking a of picture of a subject from the front, rear, left and right, and storing the resulting images to VFRONT.CE, VREAR.CE, VLEFT.CE and VRIGHT.CE;
u. for each of the four subject views, VFRONT.CE, VLEFT.CE, VREAR.CE, VRIGHT.CE, reading the CE subject view file, subtracting the VBACK.CE image data, and converting the subject view to a binary silhouette;
v. searching all four binary silhouettes to find the top of head feature;
w. searching all four silhouettes to find the centerline for top of head feature;
x. searching front and rear view silhouettes to locate armpits, neck point, crotch, shoulder point, chest, waist, hips and fingertip feature points;
y. searching left and right view silhouettes to locate neck slope, bust, waist slope, hips, and thigh feature points;
z. saving located feature points in text files: VFRONT.FE (front view), VLEFT.FE (left view), VREAR.FE (rear view) and VRIGHT.FE (right view);
aa. reading all four FE files for feature point data in measurement units;
bb. averaging top of head for height from all four images;
cc. modeling neck as a tilted ellipse and computing circumference from all four neck feature points;
dd. modeling chest as a level ellipse and computing circumference from all four chest feature points;
ee. modeling waist as a tilted ellipse and computing circumference from all four waist feature points;
ff. modeling jacket as shoulder width using front view shoulder feature points;
gg. modeling seat as hip ellipse using front view hip feature point;
hh. modeling sleeve as shoulder to wrist length and computing circumference from hip to fingertip feature points;
ii. modeling pant inseam as sloped crotch to floor length less ankle height using front view feature points;
jj. modeling sleeve inseam as sloped armpit to wrist length using front view fingertip feature points;
kk. saving nine tailor measurements (height, neck, chest, waist, hip, seat, sleeve length, sleeve inseam and pants inseam) in MEAS.ME as a text file;
ll. displaying nine tailor measurements as text on computer screen.

13. A method of calculating body measurements as claimed in claim 12 in which said camera is selected from the group consisting of a video camera, a digital camera and a film camera.

14. A method of calculating body measurements as claimed in claim 12 further comprising the step of automatically feeding said tailor body measurements to an automatic fabric cutting machine in order to fabricate a garment with the best fit.

15. A method of calculating body measurements as claimed in claim 12 further comprising the step of automatically comparing said tailor body measurements to a manufacturer's standard pattern library in order to select the best fit.

16. A method of calculating body measurements as claimed in claim 12 further comprising the step of storing said tailor body measurements on a web site where they are password protected so that only the subject and those authorized by him or her can access said tailor body measurements.

17. A method of calculating body measurements as claimed in claim 16 further comprising the step of comparing, on request, said tailor body measurements to the pattern library of an online garment vendor.

18. A method of calculating body measurements as claimed in claim 16 further comprising the step of automatically entering said tailor body measurements into an online garment order form.

19. A method of calculating tailor body measurements comprising the steps of:
a. taking a background/calibration picture with a camera;
b. electronically storing said background/calibration picture to a background/calibration image file;
c. taking a number of pictures of a subject from a number of sides;
d. saving said number of pictures to a number of subject image files;
e. subtracting said background/calibration image file from each of said subject image files to form a number of binary silhouette files;
f. determining pixels per inch in the vertical and horizontal directions from said background/calibration image file;
g. locating pertinent body features from said binary silhouette files;
h. electronically storing said pertinent body features;
i. computing tailor body measurements by combining said pertinent body features on said binary silhouette files and comparing distances to said background/calibration image file; and
j. electronically storing said tailor body measurements.

20. A method as claimed in claim 19 in which the step of taking said background/calibration picture comprises the steps of:
a. taking a background picture with said camera;
b. electronically storing said background picture;
c. taking a calibration picture with said camera; and
d. electronically storing said calibration picture.

21. A method of calculating body measurements as claimed in claim 20 in which said calibration picture includes a T shaped target including calibration markings.

22. A method of calculating body measurements as claimed in claim 19 in which the number of pictures is four and the sides are front, rear, left and right.

23. A method of calculating body measurements as claimed in claim 19 in which said background/calibration picture includes a T shaped target including calibration markings.

24. A method of calculating body measurements as claimed in claim 19 in which said pertinent body features are top of head, centerline, armpits, neck points, crotch, fingertips, neck slope, bust, waist, hips, thighs, and chest.

25. A method of calculating body measurements as claimed in claim 19 in which said tailor body measurements are height, neck, chest, waist, jacket, seat, sleeve, pant inseam and sleeve inseam.

26. A method of calculating body measurements as claimed in claim 19 further comprising the step of automatically feeding said tailor body measurements to an automatic fabric cutting machine in order to fabricate a garment with the best fit.

27. A method of calculating body measurements as claimed in claim 19 further comprising the step of automatically comparing said tailor body measurements to a manufacturer's standard pattern library in order to select the best fit.

28. A method of calculating body measurements as claimed in claim 19 further comprising the step of storing said tailor body measurements on a web site where they are password protected so that only the subject and those authorized by him or her can access said tailor body measurements.

29. A method of calculating body measurements as claimed in claim 19 further comprising the step of comparing, on request, said tailor body measurements to the pattern library of an online garment vendor.

30. A method of calculating body measurements as claimed in claim 19 further comprising the step of automatically entering said tailor body measurements into an online garment order form.

* * * * *